Nov. 9, 1948. W. C. P. ZABEL ET AL 2,453,354
CULINARY UTENSIL
Filed Dec. 7, 1945
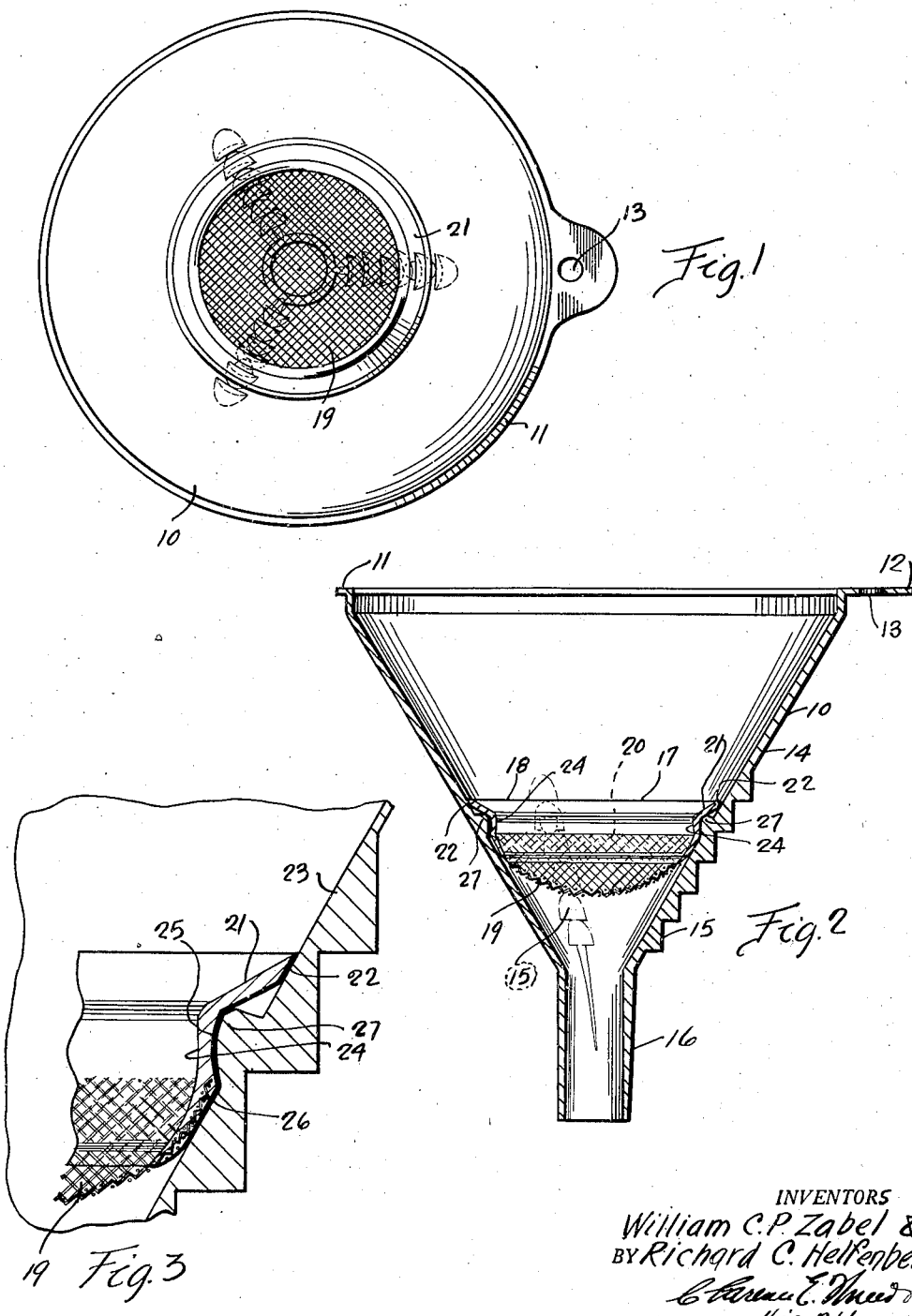
INVENTORS
William C. P. Zabel &
BY Richard C. Helfenbein
His Attorney Patented Nov. 9, 1948

2,453,354

UNITED STATES PATENT OFFICE 2,453,354

CULINARY UTENSIL

William C. P. Zabel and Richard C. Helfenbein, Chicago, Ill., assignors to Plasmetl Corporation, Chicago, Ill., a corporation of Illinois Application December 7, 1945, Serial No. 633,454

1 Claim. (Cl. 210—155)

This invention relates to certain novel improvements in a culinary utensil.

More particularly the invention relates to a combination funnel and strainer and has for its principal object the provision of an improved construction of this character which will be highly efficient in use and economical in manufacture.

Among the several objects of this invention is the provision of a funnel with a removable strainer whereby the strainer may be cleansed after use.

A still further and equally important object of this invention is to provide a simple and inexpensive construction for detachably securing the strainer within the funnel whereby the strainer may be readily removed by a severe jarring of the funnel in an inverted position, and yet remain securely in position within the funnel during the normal use and handling of the funnel.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a plan view of the invention;

Fig. 2 is a vertical sectional detail view of the same;

Fig. 3 is an enlarged detail view showing the manner of attaching the strainer in the funnel.

In the construction of our improved combination funnel and strainer, we preferably form the funnel of a plastic material. The strainer bowl, like the funnel, is also formed of a plastic material and in a manner substantially similar to that shown in our pending applications, Serial Nos. 542,155, now Patent Number 2,391,215, and 599,230, filed June 26, 1944, and June 13, 1945, respectively.

The drawings illustrate the preferred form of construction by which the several objects of our invention are accomplished.

In this connection the funnel is indicated at 10 and includes a rim portion 11 providing a handle or lip 12 perforated as at 13 to facilitate suspending from a support. On the exterior walls 14 of the funnel, there are provided rows of steps 15 which permit the funnel to be used in connection with containers having inlet openings of various diameters. The funnel 10 provides the usual spout 16.

The strainer embodied in this invention is indicated at 17 and, like that shown in our pending application, Serial No. 542,155, now Patent Number 2,391,215, it comprises a bowl 18 and a foraminated bottom 19, the latter being formed of finely woven wire mesh and having its peripheral edge 20 embedded in the bowl 18 during the molding operation thereof.

The upper end portion of the bowl 18 provides an outwardly and upwardly projecting flange 21. The portion 22 thereof is tapered to correspond to the shape of the interior wall 23 of the funnel 10. From this flange 21 extends a substantially vertical cylindrical wall 24, the exterior surface 25 of which is slightly concaved transversely for reasons hereinafter set forth. From this wall 24 extends the lower peripheral edge portion 26 of the bowl 18, and this wall portion 26 is shaped to correspond to the shape of the interior surface 23 of the funnel 10 and it is to this wall portion 26 that the strainer 17 is connected in a manner similar to that shown in our Patent Number 2,391,215.

At predetermined points upon the inner wall surface 23 of the funnel 10, there are provided latch lugs 27, and these latch lugs are shaped so as to snap into the slightly concaved portion 25 of the wall 24 when the bowl 18 of the strainer 17 is mounted within the funnel 10, as shown in Fig. 2.

To arrange the strainer 17 within the funnel, it is necessary only to position the strainer so that the strainer will be supported in a substantially horizontal plane upon the latching lugs 27 and then, by pressing the bowl 18 downwardly within the funnel 10, the latching lugs 27 will be caused to snap into the concaved portion 25 of the wall 24 and then removably secure the strainer in position.

In the construction it is intended that this snap movement of the latching lugs 27 into the concaved portion 25 of the wall 24 is very slight, just sufficient to hold the strainer 17 in position, such as shown in Fig. 2, whereby, when it is desired to remove the strainer, all that it is necessary to do is to turn the funnel 10 upside down and slap the rim 11 against the palm of the hand or on a surface, so as to unseat the strainer 17 from snapped relation with respect to the latching lugs 27.

The foregoing construction is substantially sanitary, simple and inexpensive in manufacture. The latching of the strainer in position is of such nature as requires very little effort on the part of the user to dislodge the strainer from within the funnel, yet the latching arrangement is sufficient to hold the strainer firmly within the funnel during the normal handling and use of the funnel.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claim.

Having thus described our invention, what we claim as new and desire to protect by Letters Patent is:

A utensil of the class described comprising a body having at predetermined points upon the interior wall thereof in a horizontal plane with respect to each other a plurality of latching lugs, a strainer having a peripheral flange portion tapered upwardly and outwardly and an intermediate horizontal wall portion providing an outer surface transversely concave, said lugs having convex surfaces adapted to snap into said concave surface of said horizontal wall portion when said strainer is pressed into said body, the bottom wall of said strainer extending from the lower peripheral portion of said strainer.

WILLIAM C. P. ZABEL.
RICHARD C. HELFENBEIN.

REFERENCES CITED

The following references are of record in the file of this patent:

UNITED STATES PATENTS

| Number | Name | Date |
|---|---|---|
| 453,798 | Gersdorff | June 9, 1891 |
| 1,048,546 | Ketcham | Dec. 31, 1912 |
| 1,530,411 | Restchak | Mar. 17, 1927 |
| 1,788,760 | Applegate | Jan. 13, 1931 |